US010038467B1

(12) United States Patent
Tien

(10) Patent No.: US 10,038,467 B1
(45) Date of Patent: Jul. 31, 2018

(54) MOBILE DEVICE PROTECTIVE COVER WITH SUPPORTIVE BRACE AND METHOD OF MANUFACTURING SAME

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/652,350

(22) Filed: Jul. 18, 2017

(30) Foreign Application Priority Data

Jan. 23, 2017 (CN) .......................... 2017 1 0058453

(51) Int. Cl.
| | | |
|---|---|---|
| *H04B 1/38* | (2015.01) | |
| *A45C 11/00* | (2006.01) | |
| *A45C 13/00* | (2006.01) | |
| *A45F 5/00* | (2006.01) | |
| *H04B 1/3888* | (2015.01) | |

(52) U.S. Cl.
CPC ............ *H04B 1/3888* (2013.01); *A45C 11/00* (2013.01); *A45C 13/002* (2013.01); *A45F 5/00* (2013.01); *A45C 2011/002* (2013.01); *A45C 2011/003* (2013.01); *A45C 2200/15* (2013.01)

(58) Field of Classification Search
CPC ..... H04B 1/3888; A45C 11/00; A45C 13/002; A45C 2011/002; A45C 2011/003; A45C 2200/15; A45F 5/00; H04M 1/00; F16M 11/04

See application file for complete search history.

(56) References Cited

U.S. PATENT DOCUMENTS

| | | | | |
|---|---|---|---|---|
| 6,672,549 B2* | 1/2004 | Kolb | ................... | B60R 11/0241 |
| | | | | 248/127 |
| 8,070,026 B2* | 12/2011 | Wadsworth | ............ | A45C 11/00 |
| | | | | 224/197 |
| 8,100,376 B2* | 1/2012 | Ye | ........................ | A47B 23/043 |
| | | | | 248/454 |
| 8,464,995 B2* | 6/2013 | Yang | ...................... | F16M 11/10 |
| | | | | 248/454 |
| 9,101,188 B2* | 8/2015 | Magness | ............... | G06F 1/1656 |
| 9,641,212 B1* | 5/2017 | Tien | ........................ | A45C 11/00 |
| 9,660,683 B2* | 5/2017 | Tien | ..................... | H04B 1/3888 |
| 9,743,730 B2* | 8/2017 | Tien | ........................ | A45C 11/00 |

(Continued)

FOREIGN PATENT DOCUMENTS

CN          205125358 U          4/2016

*Primary Examiner* — Pablo Tran
(74) *Attorney, Agent, or Firm* — ScienBiziP, P.C.

(57) ABSTRACT

A protective cover with deployable supportive brace includes a housing, a bending member, and a support member. The housing has a receiving opening, and a recessed track. The bending member also has a bent portion, and a guide. The bent portion is received in the receiving opening, and has a first section, and a second section. The guide is received in and movable along the recessed track. The support member is received in the receiving opening, is pivotable relative to the first section, and has two end portions. One end portion is secured to the second section, and the other end portion is adjacent to the first section. When pulled out and deployed, the support member and housing can support the mobile device in a free-standing manner for long term viewing.

10 Claims, 8 Drawing Sheets

(56) References Cited

U.S. PATENT DOCUMENTS

| | | | |
|---|---|---|---|
| 2007/0211420 A1* | 9/2007 | Bang | G06F 1/1626 361/679.27 |
| 2010/0059649 A1* | 3/2010 | Buxton | F16M 13/00 248/371 |
| 2010/0072334 A1* | 3/2010 | Le Gette | F16M 13/00 248/176.3 |
| 2010/0142130 A1* | 6/2010 | Wang | H04M 1/04 361/679.01 |
| 2011/0103032 A1* | 5/2011 | Loi | F16M 11/10 361/809 |
| 2011/0285258 A1* | 11/2011 | Yuan | G06F 1/1626 312/223.2 |
| 2012/0162102 A1* | 6/2012 | Cheng | F16M 11/041 345/173 |
| 2012/0262853 A1* | 10/2012 | Sung | F16M 11/10 361/679.01 |
| 2012/0314342 A1* | 12/2012 | Sheu | G06F 1/1628 361/679.01 |
| 2012/0325689 A1* | 12/2012 | Wibby | A47B 23/043 206/45.2 |
| 2013/0127308 A1* | 5/2013 | Yang | A45C 11/00 312/223.1 |

* cited by examiner

US 10,038,467 B1

MOBILE DEVICE PROTECTIVE COVER WITH SUPPORTIVE BRACE AND METHOD OF MANUFACTURING SAME

CROSS REFERENCE TO RELATED APPLICATION

This application claims priority to Chinese Patent Application No. 201710058453.3, filed Jan. 23, 2017, the disclosure of which is incorporated herein by reference in its entirety.

FIELD

The present disclosure relates to protective covers, and more particularly to a protective cover for protecting and supporting a mobile device, and a method for manufacturing the protective cover.

BACKGROUND

A user's hands get tired after a long time holding a smartphone, tablet, or other mobile devices, and the user cannot do other things by hands when holding the mobile device. In addition, the hand-held mobile device can fall and become damaged when the user's grip slips.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
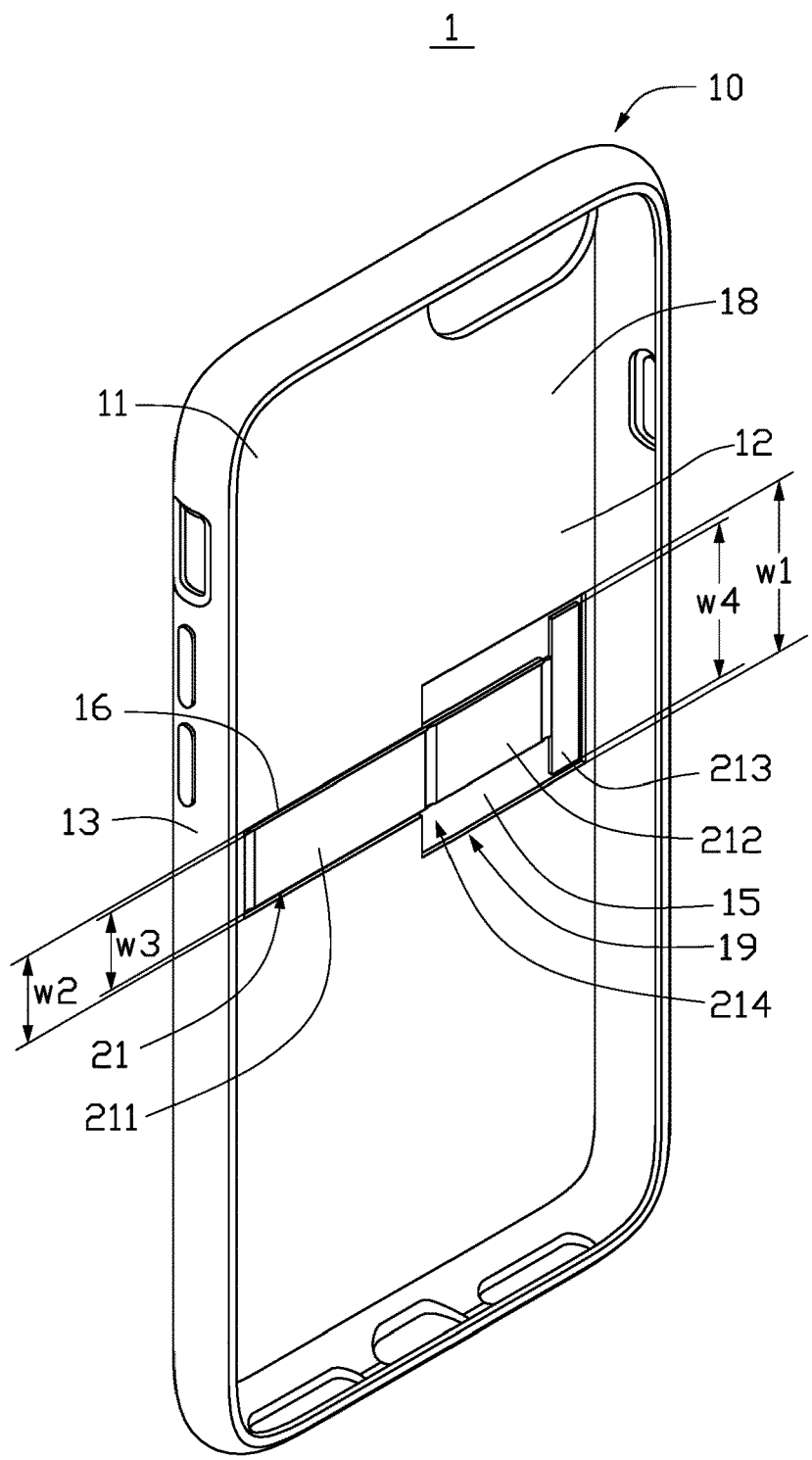
FIG. 1 is a front perspective view of a protective cover of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" means "including but not limited to"; it specifically indicates open-ended inclusion or membership in the so-described combination, group, series, and the like.

Figure 2:
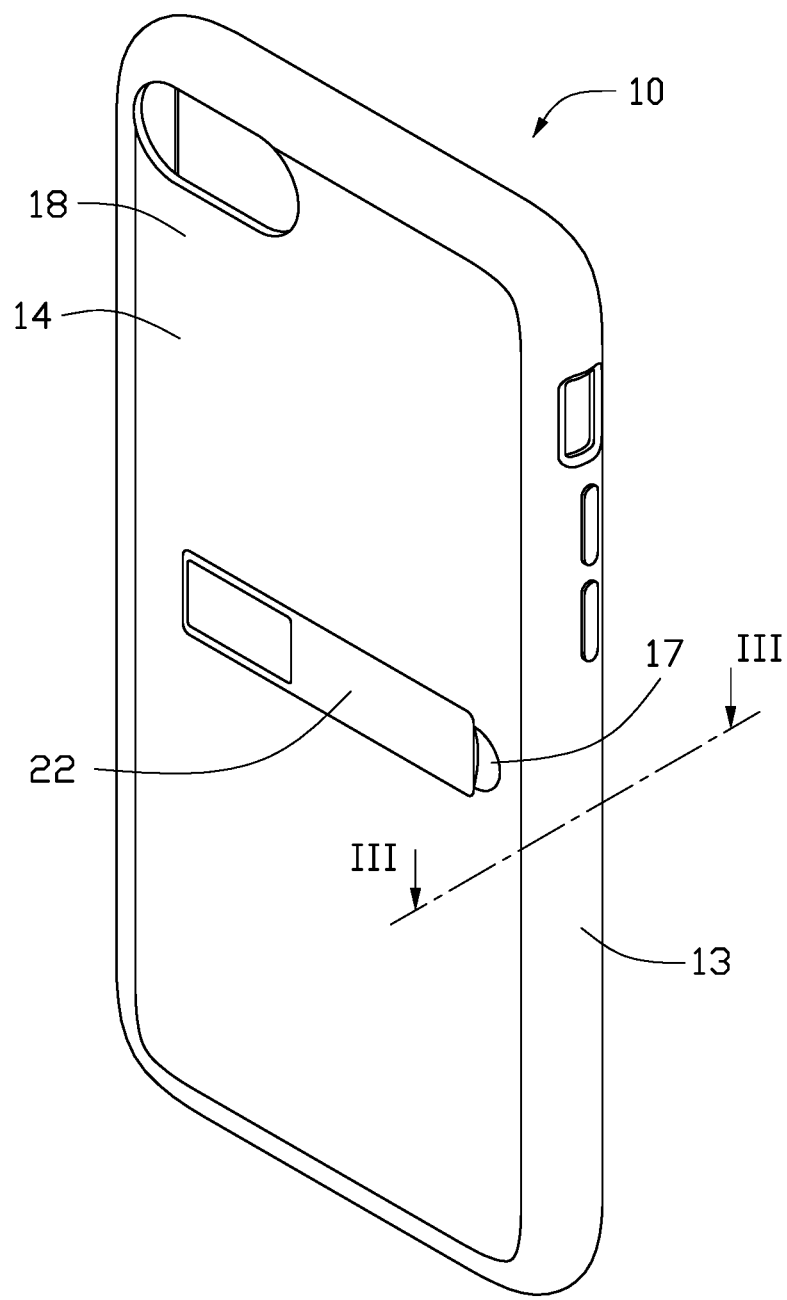
FIG. 2 is a rear perspective view of the protective cover of FIG. 1.
Figure 3:
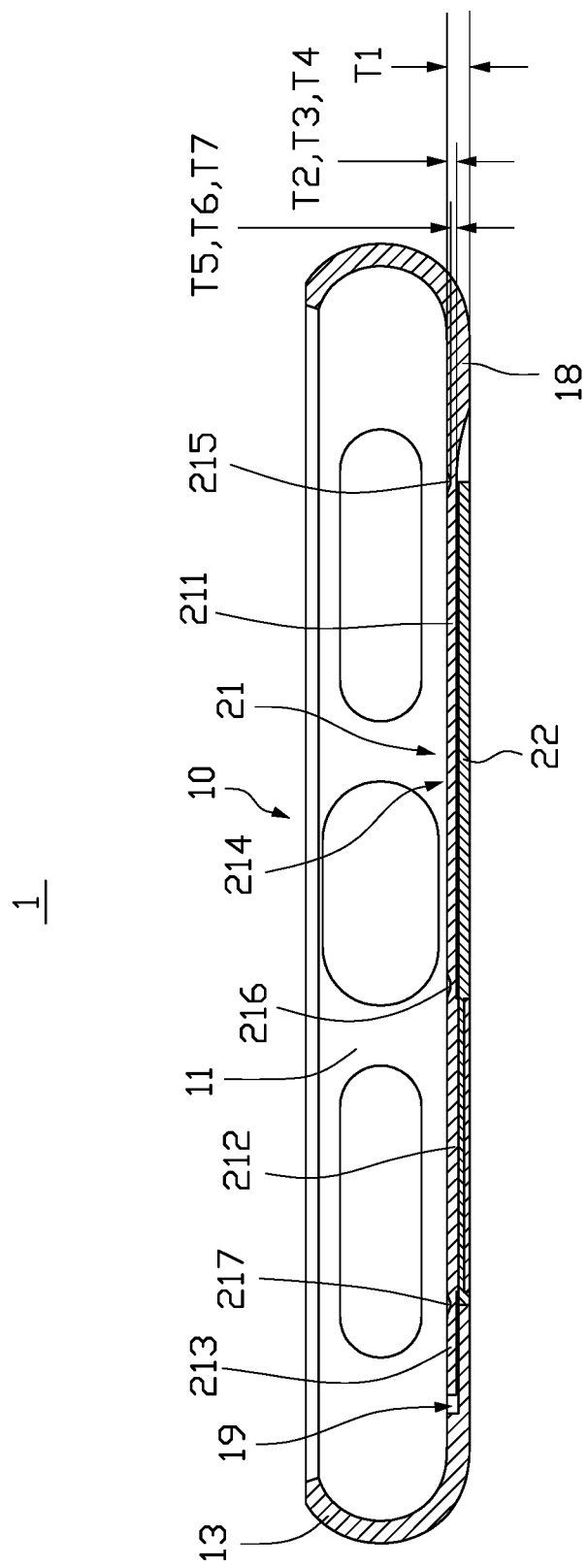
FIG. 3 is an enlarged sectional view of the protective cover taken along line of FIG. 2.

With reference to FIGS. 1 to 3, an exemplary embodiment of a protective cover 1 for covering and protecting a mobile device such as a smartphone or tablet is disclosed. The protective cover 1 is used for supporting the mobile device such that the mobile device can be free-standing so a user can view a screen of the mobile device without holding the mobile device by hand.

The protective cover 1 includes a housing 10, a bending member 21, and a support member 22.

The housing 10 includes a base 18, a peripheral wall 13, a chamber 11, and a receiving cavity 19. The base 18 has an inner surface 12, an outer surface 14, and is of a thickness T1. The chamber 11 is defined between the base 18 and the peripheral wall 13, and receives a mobile device. A shape of the chamber 11 corresponds to the mobile device. The receiving cavity 19 is defined in the base 18, the receiving cavity 19 receives the bending member 21 and the support member 22, and has a receiving opening 16, and a recessed track 15. The recessed track 15 communicates with the receiving opening 16.

In the present exemplary embodiment, the receiving opening 16 is elongated, and is formed through the base 18. The recessed track 15 is formed in the inner surface 12 of the base 18, is disposed at an end portion of the receiving opening 16, and has two ends. A width W1 of the recessed track 15 is greater than a width W2 of the receiving opening 16. A notch 17 is formed in the outer surface 14 of the base 18, the notch 17 communicates with the receiving opening 16, and is disposed at an end of the receiving opening 16 away from the recessed track 15. The notch 17 allows a user to pull out the support member 22. Locations of the receiving opening 16, recessed track 15, and notch 17 are not limited to those shown in the drawings. In other exemplary embodiments, the receiving opening 16, recessed track 15, and notch 17 may be disposed at any locations on the housing 10.

The bending member 21 includes a bent portion 214, and a guide 213. The bent portion 214 is received in the receiving opening 16 of the housing 10, is bendable, and has a width W3, a first section 211, and a second section 212. The first section 211 has two ends, and a thickness T2. The second section 212 has two ends, and a thickness T3. One end of the first section 211 is pivotally mounted to an inner surface of the receiving opening 16 of the housing 10 away from the recessed track 15. The other end of the first section 211 is pivotally mounted to one end of the second section 212. The other end of the second section 212 is pivotally mounted to the guide 213. The guide 213 is received in and is movable along the recessed track 15 of the housing 10, and has a width W4, and a thickness T4. In the present exemplary embodiment, the bent portion 214 is elongated. The width W4 of the guide 213 is greater than the width W3 of the bent portion 214 to form a T-shaped structure.

The support member 22 is received in the receiving opening 16 of the housing 10, is pivotable relative to the first section 211 of the bending member 21, and includes two end portions. One of the end portions of the support member 22 is secured to the second section 212 of the bending member 21. The other end portion of the support member 22 is adjacent to the first section 211 of the bending member 21. In the present exemplary embodiment, the support member 22 is elongated. A length of the support member 22 is substantially equal to a length of the bent portion 214.

In the present exemplary embodiment, the housing 10 and the bending member 21 are integrally formed and connected to each other, such as by the support member 22 being embedded in the bending member 21. The housing 10 and the bending member 21 are made of an elastic material, for example, thermoplastic polyurethane (TPU), thermoplastic elastomer (TPE), polypropylene, or the like. The support member 22 is made of a rigid material that is not easily bent, for example, iron, aluminum, or aluminum alloy, polycarbonate (PC), or the like.

Figure 4:
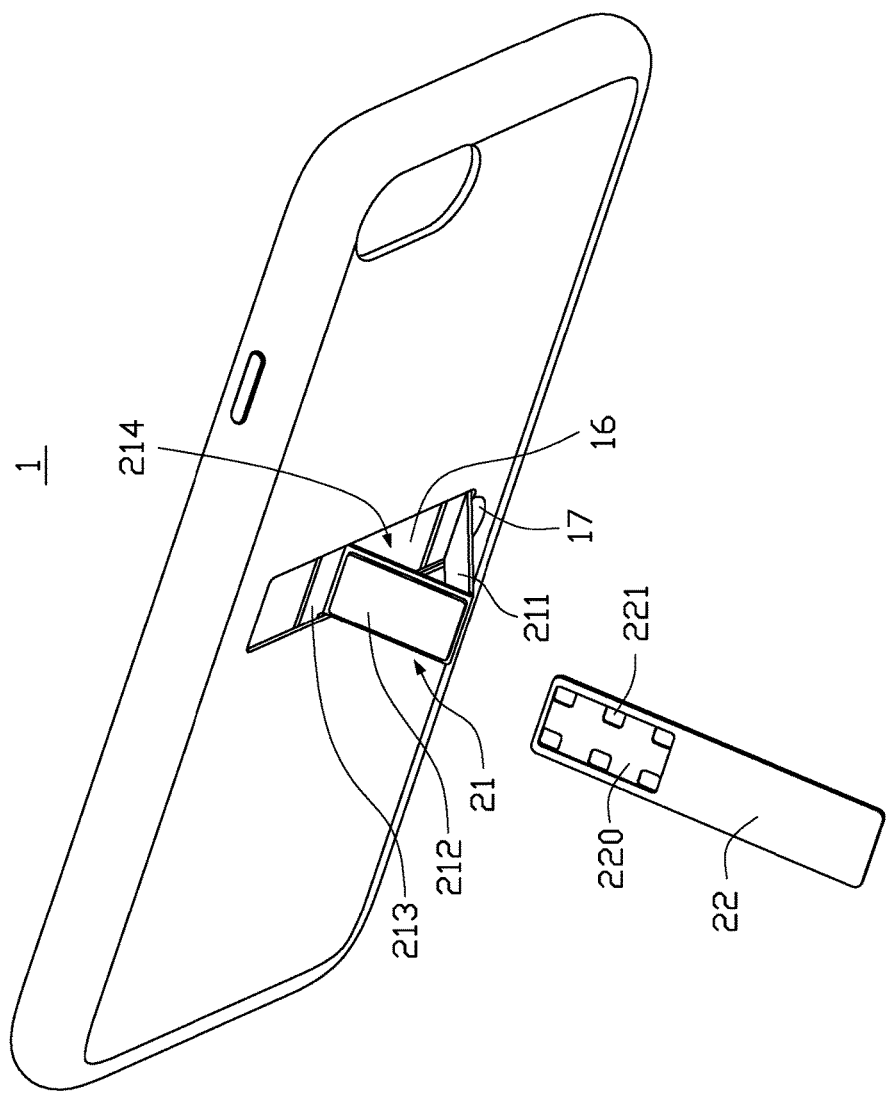
FIG. 4 is an exploded rear perspective view of the protective cover of FIG. 1.

With reference to FIG. 4, in the present exemplary embodiment, the support member 22 includes a recess 220, and a plurality of holes 221. The recess 220 is formed in the end portion of the support member 22 which is secured to the second section 212 of the bending member 21. The holes 221 are formed through the support member 22, and are defined in the recess 220. The elastic material for forming the bending member 21 is injected into the recess 220 to pass through the holes 221 such that the end portion of the support member 22 is embedded in the second section 212 of the bending member 21. In other exemplary embodiments, the end portion of the support member 22 may be secured to the second section 212 of the bending member 21 by other connectors, such as, but not limited to, screws, buckles, and cuffs.

With reference to FIG. 3, in the present exemplary embodiment, a thickness T5 of a mounting portion 215 between the base 18 and the first section 211 is less than the thickness T1 or T2 of one of the base 18 and the first section 211, a thickness T6 of a mounting portion 216 between the first section 211 and the second section 212 is less than the thickness T2 or T3 of one of the first section 211 and the second section 212, and a thickness T7 of a mounting portion 217 between the second section 212 and the guide 213 is less than the thickness T3 or T4 of one of the second section 212 and the guide 213, such that the mounting portions 215, 216, and 217 provide a mounting which can pivot, and are easily bent when force is applied thereto. In other exemplary embodiments, the bending member 21 may be made of a rigid material, and shafts or hinge pins may be mounted on the base 18, first section 211, second section 212, and guide 213.

The housing 10 further includes openings and other structures corresponding to a camera, headphone jack, and other ports. The openings and other structures are not technical features of the present disclosure.

Figure 5:
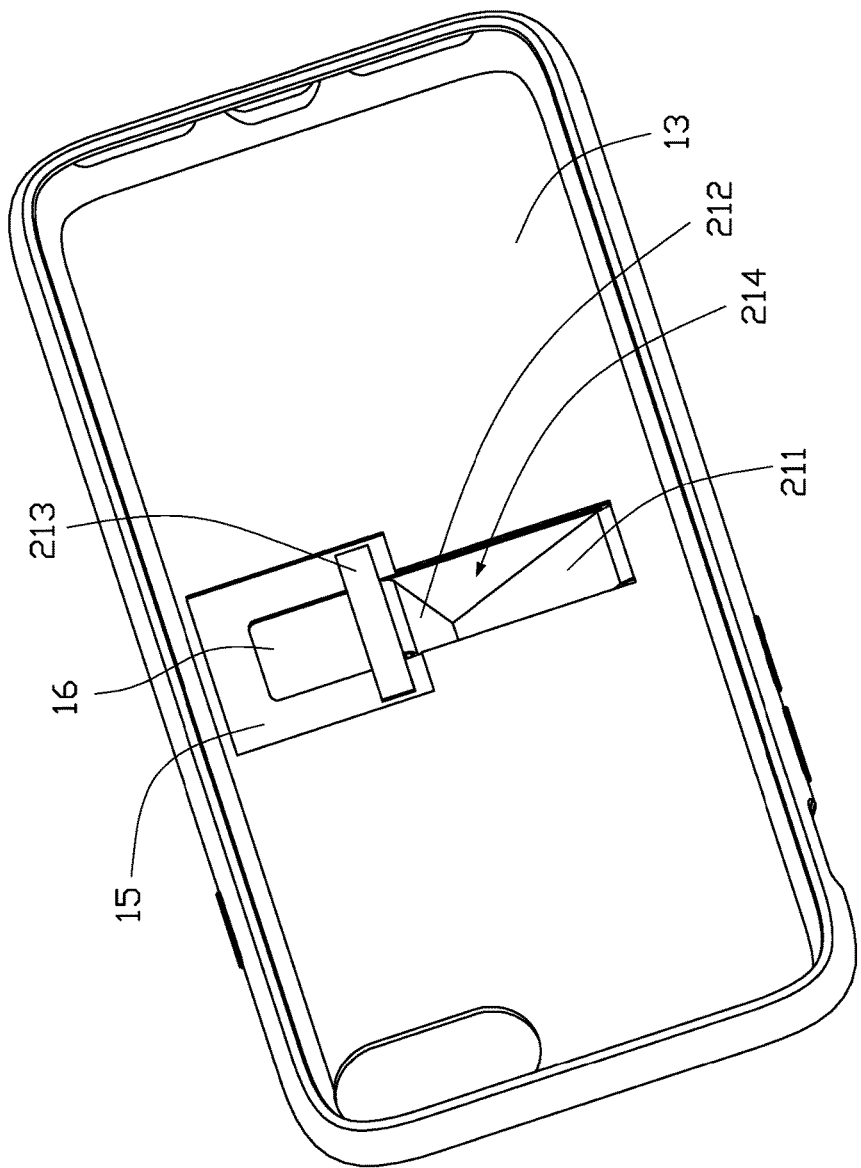
FIG. 5 is a front perspective view of the protective cover of FIG. 1 shown in use.
Figure 6:
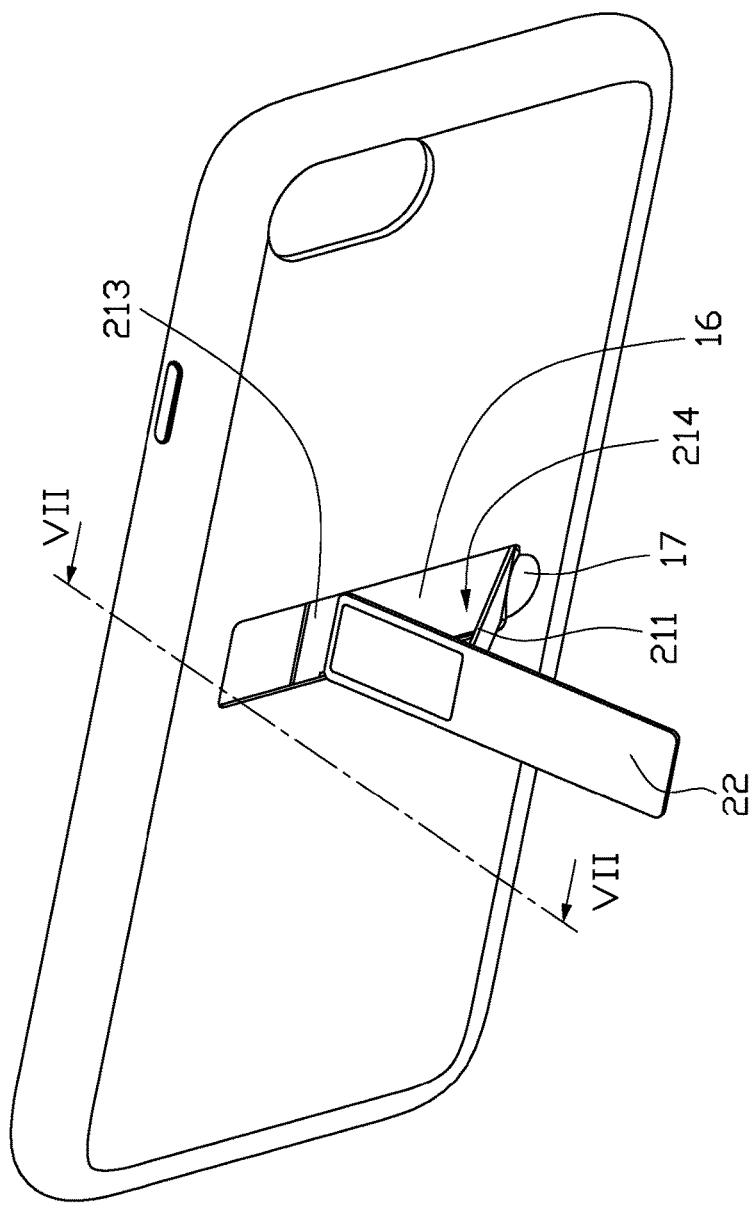
FIG. 6 is a rear perspective view of the protective cover of FIG. 1 shown in use.
Figure 7:
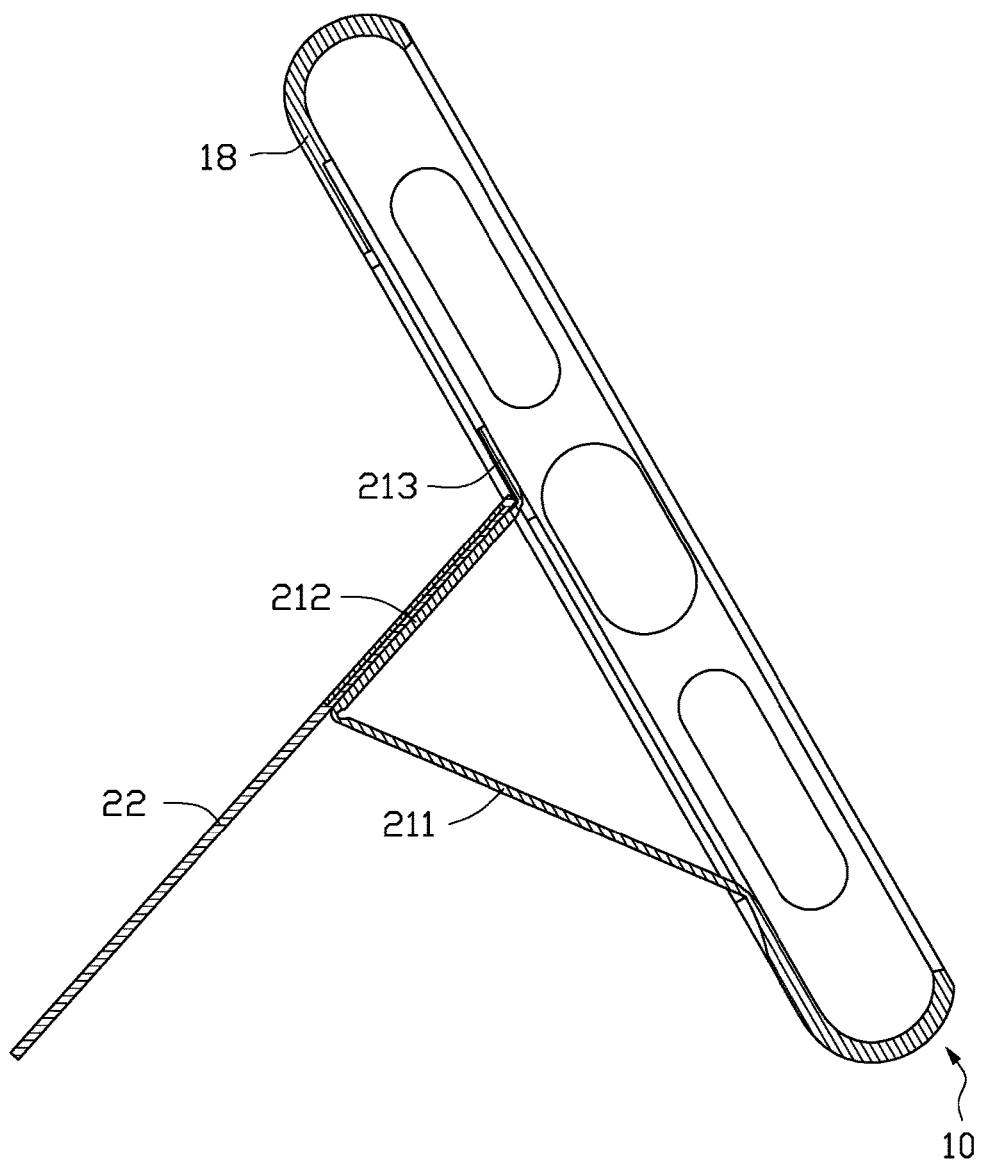
FIG. 7 is an enlarged sectional view of the protective cover taken along line VII-VII of FIG. 6.

With reference to FIGS. 1 and 2, when the support member 22 is not pulled out, the support member 22 and the bent portion 214 are received in the receiving opening 16, and the guide 213 is received in the recessed track 15 to occupy very little space. The guide 213 is located at one of the ends of the recessed track 15 away from a center of the receiving opening 16. With reference to FIGS. 5 and 6, when the support member 22 is pulled out, the bent portion 214 bends, and the guide 213 is moved to the other end of the recessed track 15 adjacent to the center of the receiving opening 16. With reference to FIG. 7, the support member 22, the base 18, and the first section 211 form an A-shaped structure when the support member 22 is pulled out. The support member 22 and housing 10 can rest on a horizontal surface (e.g., a desktop) to support the mobile device, such that the mobile device can be free-standing.

Figure 8:
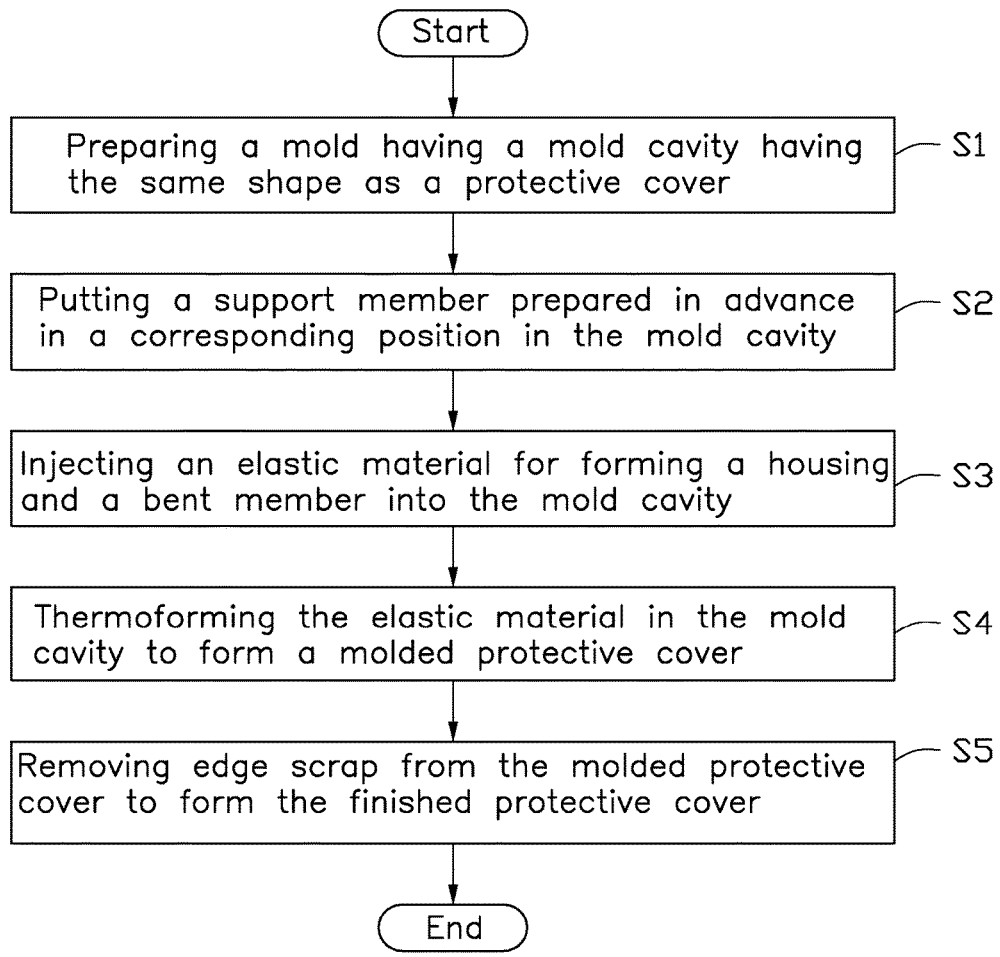
FIG. 8 is a flow diagram of a method for manufacturing a protective cover of a mobile device.

With reference to FIG. 8, an exemplary embodiment of a method for manufacturing the protective cover 1 includes the steps of: Step S1, preparing a mold having a mold cavity having the same shape as the protective cover 1; Step S2, putting the support member 22 prepared in advance in a corresponding position in the mold cavity; Step S3, injecting the elastic material for forming the housing 10 and the bent member 21 into the mold cavity; Step S4, thermoforming the elastic material in the mold cavity to form a molded protective cover; and Step S5, removing edge scrap from the molded protective cover to form the finished protective cover 1.

The exemplary embodiments shown and described above are only examples. Many details are often found in the art such as the other features of a protective cover and a method of manufacture thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A protective cover comprising:
   a housing having:
      a base having a thickness;
      a chamber; and
      a receiving cavity defined in the base, and having:
         a receiving opening; and
         a recessed track communicating with the receiving opening;
   a bending member having:
      a bent portion received in the receiving opening of the housing, and having:
         a first section having two ends and a thickness; and
         a second section having two ends and a thickness; and
      a guide received in and movable along the recessed track of the housing and having a thickness; and
   a support member received in the receiving opening of the housing, pivotable relative to the first section, and having two end portions;
   wherein one of the ends of the first section is pivotally mounted to an inner surface of the receiving opening of the housing away from the recessed track, the other end of the first section is pivotally mounted to one of the ends of the second section, and the other end of the second section is pivotally mounted to the guide; and
   wherein one of the end portions of the support member is secured to the second section, and the other end portion of the support member is adjacent to the first section.

2. The protective cover of claim 1, wherein the housing and the bending member are integrally formed, and the support member is connected to the bending member.

3. The protective cover of claim 2,
   wherein the support member has
      a recess formed in the end portion of the support member secured to the second section; and
      a plurality of holes formed through the support member, and defined in the recess; and wherein an elastic material for forming the bending member is injected into the recess to pass through the holes such that the end portion of the support member is integrally formed with the second section.

4. The protective cover of claim 1, wherein the housing and the bending member are made of an elastic material, and the support member is made of a rigid material.

5. The protective cover of claim 2, wherein the housing and the bending member are made of an elastic material, and the support member is made of a rigid material.

6. The protective cover of claim 1, wherein a thickness of a mounting portion between the base and the first section is less than the thickness of one of the base and the first section, a thickness of a mounting portion between the first section and the second section is less than the thickness of one of the first section and the second section, and a thickness of a mounting portion between the second section and the guide is less than the thickness of one of the second section and the guide.

7. The protective cover of claim 2, wherein a thickness of a mounting portion between the base and the first section is less than the thickness of one of the base and the first section, a thickness of a mounting portion between the first section and the second section is less than the thickness of one of the first section and the second section, and a thickness of a mounting portion between the second section and the guide is less than the thickness of one of the second section and the guide.

8. The protective cover of claim 1,
wherein the recessed track is formed in an inner surface of the base, and a width of the recessed track is greater than a width of the receiving opening; and
wherein a width of the guide is greater than a width of the bent portion.

9. The protective cover of claim 2,
wherein the recessed track is formed in an inner surface of the base, and a width of the recessed track is greater than a width of the receiving opening; and
wherein a width of the guide is greater than a width of the bent portion.

10. The protective cover of claim 1, wherein a notch is formed in an outer surface of the base, communicates with the receiving opening, and is disposed at an end of the receiving opening away from the recessed track so as to allow a user to pull the support member received in the receiving opening.

\* \* \* \* \*